US009507517B2

(12) United States Patent
Kim et al.

(10) Patent No.: US 9,507,517 B2
(45) Date of Patent: *Nov. 29, 2016

(54) MOBILE TERMINAL AND METHOD OF CONTROLLING THE SAME

(71) Applicant: Microsoft Technology Licensing, LLC, Redmond, WA (US)

(72) Inventors: Tae Hun Kim, Incheon-si (KR); Jang Jae Jung, Seoul (KR)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 209 days.
This patent is subject to a terminal disclaimer.

(21) Appl. No.: 13/669,138

(22) Filed: Nov. 5, 2012

(65) Prior Publication Data

US 2013/0067387 A1 Mar. 14, 2013

Related U.S. Application Data

(63) Continuation of application No. 12/173,680, filed on Jul. 15, 2008, now Pat. No. 8,331,991.

(30) Foreign Application Priority Data

Oct. 2, 2007 (KR) ........................ 10-2007-0099411

(51) Int. Cl.
*H04M 1/00* (2006.01)
*H04B 1/38* (2015.01)
(Continued)

(52) U.S. Cl.
CPC ......... *G06F 3/04886* (2013.01); *G06F 3/0481* (2013.01); *G06F 3/0489* (2013.01)

(58) Field of Classification Search
USPC ............ 455/566, 575.1–575.9; 345/689, 173
See application file for complete search history.

(56) References Cited

U.S. PATENT DOCUMENTS 5,422,656 A 6/1995 Allard et al.
5,615,384 A 3/1997 Allard et al.
(Continued)

FOREIGN PATENT DOCUMENTS

CN 1196526 A 10/1998
CN 1588367 A 3/2005
(Continued)

OTHER PUBLICATIONS

"Google desktop 5.1.706.29690," Jul. 2007, http://www.filehorse.com/download-google-desktop/1420/screenshots/, 1 page total.
(Continued)

*Primary Examiner* — Edward Urban
*Assistant Examiner* — Rui Hu
(74) *Attorney, Agent, or Firm* — Judy Yee; Micky Minhas

(57) ABSTRACT

A broadcast receiver and method for controlling the same are discussed. According to an embodiment, the broadcast receiver includes a display unit, a communication unit configured to establish an Internet access and receive a broadcast, and a control unit. The control unit displays on the display unit a text input box selectively usable for a first search category and a second search category, and displays a current category indicator indicating a current search category of the text input box. When the current category indicator is selected to change the current search category, the current search category of the text input box is changed from the first search category to the second search category, and an appearance of the current category indicator for the text input box is changed to indicate the changed search category.

17 Claims, 13 Drawing Sheets

(51) Int. Cl.
  *G06F 3/0488*  (2013.01)
  *G06F 3/0481*  (2013.01)
  *G06F 3/0489*  (2013.01)

(56)  References Cited

U.S. PATENT DOCUMENTS

| | | | |
|---|---|---|---|
| 5,911,138 A * | 6/1999 | Li | G06F 17/30398 |
| 6,078,314 A | 6/2000 | Ahn | |
| 6,307,541 B1 | 10/2001 | Ho et al. | |
| 6,322,366 B1 * | 11/2001 | Bergan | G09B 7/02 434/118 |
| 7,389,221 B1 | 6/2008 | Pearson et al. | |
| 7,669,142 B2 * | 2/2010 | Ray | G06F 17/30905 715/254 |
| 7,787,916 B2 | 8/2010 | Hamamura et al. | |
| 8,000,750 B2 | 8/2011 | Honda et al. | |
| 8,117,195 B1 * | 2/2012 | Dave | G06F 17/30864 707/706 |
| 8,396,849 B2 * | 3/2013 | Sauve | G06F 17/30861 707/706 |
| 8,745,067 B2 * | 6/2014 | Cierniak | G06F 17/30864 707/749 |
| 2002/0087748 A1 | 7/2002 | Park et al. | |
| 2003/0001816 A1 | 1/2003 | Badarneh | |
| 2003/0092400 A1 | 5/2003 | Shimabukuro | |
| 2003/0128188 A1 | 7/2003 | Wilbring et al. | |
| 2003/0225756 A1 * | 12/2003 | Liu | G06F 3/0236 |
| 2004/0061720 A1 * | 4/2004 | Weber | G06F 17/30899 715/760 |
| 2004/0135774 A1 | 7/2004 | LaMonica | |
| 2004/0139480 A1 | 7/2004 | Delpuch et al. | |
| 2005/0026657 A1 | 2/2005 | Hasegawa et al. | |
| 2005/0085215 A1 | 4/2005 | Kokko et al. | |
| 2006/0080303 A1 * | 4/2006 | Sargent | G06F 17/30613 |
| 2006/0107231 A1 | 5/2006 | Matthews et al. | |
| 2006/0187211 A1 | 8/2006 | Uusitalo et al. | |
| 2006/0190441 A1 * | 8/2006 | Gross | G06F 17/30864 |
| 2006/0242129 A1 | 10/2006 | Libes et al. | |
| 2006/0277482 A1 | 12/2006 | Hoffman et al. | |
| 2006/0281448 A1 | 12/2006 | Plestid et al. | |
| 2007/0027848 A1 | 2/2007 | Howard et al. | |
| 2007/0088680 A1 * | 4/2007 | Sauve | G06F 17/30864 |
| 2007/0204232 A1 * | 8/2007 | Ray | G06F 17/30905 715/738 |
| 2007/0233692 A1 * | 10/2007 | Lisa | G06F 17/30651 |
| 2008/0005668 A1 * | 1/2008 | Mavinkurve | G06F 3/0481 715/764 |
| 2008/0028292 A1 | 1/2008 | Graham et al. | |
| 2008/0115124 A1 * | 5/2008 | Remer | G06F 9/44526 717/178 |
| 2008/0122796 A1 * | 5/2008 | Jobs | G06F 3/0488 345/173 |
| 2008/0139227 A1 | 6/2008 | Wong et al. | |
| 2008/0189591 A1 | 8/2008 | Lection | |
| 2008/0215307 A1 | 9/2008 | Li et al. | |
| 2008/0235187 A1 | 9/2008 | Gade et al. | |
| 2008/0320419 A1 * | 12/2008 | Matas | G01C 21/20 715/863 |
| 2011/0178864 A1 * | 7/2011 | Error | G06F 17/3089 705/14.41 |

FOREIGN PATENT DOCUMENTS

| | | | |
|---|---|---|---|
| CN | 1761190 A | 4/2006 | |
| CN | 1786892 A | 6/2006 | |
| DE | 69434096 T2 * | 2/2006 | G06F 17/30398 |
| JP | 2005-100199 A | 4/2005 | |
| JP | 2006-302184 A | 11/2006 | |
| KR | 10-2006-0058320 A | 5/2006 | |
| KR | 10-2007-0045645 A | 5/2007 | |
| KR | 10-2007-0054004 A | 5/2007 | |
| TW | M240740 U | 8/2004 | |
| TW | I260138 B | 8/2006 | |
| TW | I286204 B | 9/2007 | |
| WO | WO 2007/059503 A1 | 5/2007 | |

OTHER PUBLICATIONS

Coombs et al., "Google Power Tools Bible," Mar. 12, 2007, Ch. 11, pp. 131-135.
Maliouta, "Windows Search Guide in IE7", MSDN Blogs, IEBlog, 2 pages, http://blogs.msdn.com/b/ie/archive/2006/10/23/windows-search-guide-in-ie7.aspx (posted Oct. 23, 2006).
Mozilla, "Internet Keywords", http://replay.waybackmachine.org/20061112030251/http://www.mozilla.org/docs/end-user/internet-keywords.html, XP-002627372, Nov. 12, 2006.
Poremsky, "Google and Other Search Engines: Visual Quickstart Guide," Safari Books Online, Peachpit Press, May 11, 2004, 3 pages.
Linderman, "iPhone's disappearing spacebar," Basecamp, Jun. 28, 2007, URL:http://37signals.com/svn/posts/492-iphones-disappearing-spacebar [retrieved on Feb. 28, 2012], pp. 1-9, XP55020475.
European Patent Office, Office Action Issued in European Patent Application No. 08164742.2, Jan. 25, 2016, Netherlands, 8 pages.
U.S. Appl. No. 12/173,680, filed Jul. 15, 2008.
U.S. Appl. No. 12/242,208, filed Sep. 30, 2008.
The State Intellectual Property Office of China, First Office Action and Search Report issued in Chinese Patent Application No. 201410108030.4, May 4, 2016, China, 19 Pages.
U.S. Appl. No. 12/173,680, filed 15, 2008.
Maliouta, "Windows Search Guide in IE7", MSDN Blogs, IEBlog, 2 pages, http://blogs.msdn.com/b/ie/archive/2006/10/23/windows-search-guide-in-ie7.aspx (posted Oct. 23, 2006).
Mozilla, "Internet Keywords", http://replay.waybackmachine.org/20061112030251/http://www.mozilla.org/docs/end-user/internetkeywords.html, XP-002627372, Nov. 12, 2006.
Sauvé, "Searching is better in Beta 2!" MSDN Blogs, IEBlog, 2 pages, http://blogs.msdn.com/b/ie/archive/2006/02/07/527266.aspx (posted Feb. 7, 2006).

\* cited by examiner

MOBILE TERMINAL AND METHOD OF CONTROLLING THE SAME

CROSS REFERENCE TO RELATED APPLICATIONS

This application is a continuation application of co-pending U.S. application Ser. No. 12/173,680, filed Jul. 15, 2008, which in turn claims the benefit of the Korean Patent Application No. 10-2007-0099411, filed on Oct. 2, 2007. The entire contents of all these applications are herein fully incorporated by reference.

BACKGROUND OF THE INVENTION

1. Field of the Invention

The present invention relates to a mobile terminal, and more particularly, to a mobile terminal and method of controlling the same. Although the present invention is suitable for a wide scope of applications, it is particularly suitable for configuring a display screen to enhance user's convenience.

2. Discussion of the Related Art

A mobile terminal is a device which may be configured to perform various functions. Examples of such functions include data and voice communications, capturing images and video via a camera, recording audio, playing music files via a speaker system, and displaying images and video on a display. Some terminals include additional functionality which supports game playing, while other terminals are configured as multimedia players. More recently, mobile terminals have been configured to receive broadcast and multicast signals which permit viewing of content such as videos and television programs.

Efforts are ongoing to support and increase the functionality of mobile terminals. Such efforts include software and hardware improvements, as well as changes and improvements in the structural components which form the mobile terminal.

Recently, various terminals equipped with touchscreens, via which various commands can be inputted, have been introduced.

Hence, it is necessary to discuss how to facilitate a user to input various commands with a prescribed configuration of a display screen or a touchscreen.

SUMMARY OF THE INVENTION

Accordingly, the present invention is directed to a mobile terminal, computer program product and method for controlling the same that substantially obviate one or more problems due to limitations and disadvantages of the related art.

An object of the present invention is to provide a mobile terminal, computer program product and method for controlling the same, by which a terminal user is enabled to input specific commands to the mobile terminal with minimum effort in a manner of configuring a display screen with consideration of enhanced user's convenience.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, a mobile terminal according to the present invention includes a display unit, a wireless communication unit for an internet access, a user input unit for receiving an input from a user, and a control unit configured to display both a text input box and an indicator indicating a selected one among at least two functions of the text input box on a standby image of the display unit.

In another aspect of the present invention, a method of controlling a mobile terminal includes displaying a text input box on a standby image, and allocating at least two functions to the text input box.

In another aspect of the present invention, a broadcast receiver includes a display unit; a communication unit configured to establish an Internet access and receive a broadcast; and a control unit configured to: display the received broadcast on the display unit, display on the display unit a text input box, the text input box selectively usable for a first search category and a second search category, and display a current category indicator indicating a current search category of the text input box, wherein, when the current category indicator is selected to change the current search category, the current search category of the text input box is changed from the first search category to the second search category, and an appearance of the current category indicator for the text input box is changed to indicate the changed search category, wherein the changed appearance of the current category indicator is being displayed with the text input box, and wherein the first search category is for searching information via the Internet access, and the second search category is for searching information within the broadcast receiver.

In another aspect of the present invention, a method of controlling a broadcast receiver, includes receiving a broadcast; displaying the received broadcast; establishing an Internet access; displaying, by the broadcast receiver, a text input box, the text input box selectively usable for a first search category and a second search category; and displaying, by the broadcast receiver, a current category indicator indicating a current search category of the text input box, wherein, when the current category indicator is selected to change the current search category, the current search category of the text input box is changed from the first search category to the second search category, and an appearance of the current category indicator for the text input box is changed to indicate the changed search category, wherein the changed appearance of the current category indicator is being displayed with the text input box, and wherein the first search category is for searching information via the Internet access, and the second search category is for searching information within the broadcast receiver.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE INVENTION

Reference will now be made in detail to the preferred embodiments of the present invention, examples of which are illustrated in the accompanying drawings. It is to be understood by those of ordinary skill in this technological field that other embodiments may be utilized, and structural, electrical, as well as procedural changes may be made without departing from the scope of the present invention. Wherever possible, the same reference numbers will be used throughout the drawings to refer to the same or like parts.

In the following description, suffixes 'module', 'unit' and 'part' for elements are given to facilitate the preparation of this disclosure only. So, significant meanings or roles are not given to the suffixes themselves. Hence, it is understood that the 'module', 'unit' and 'part' can be used together.

Figure 1:
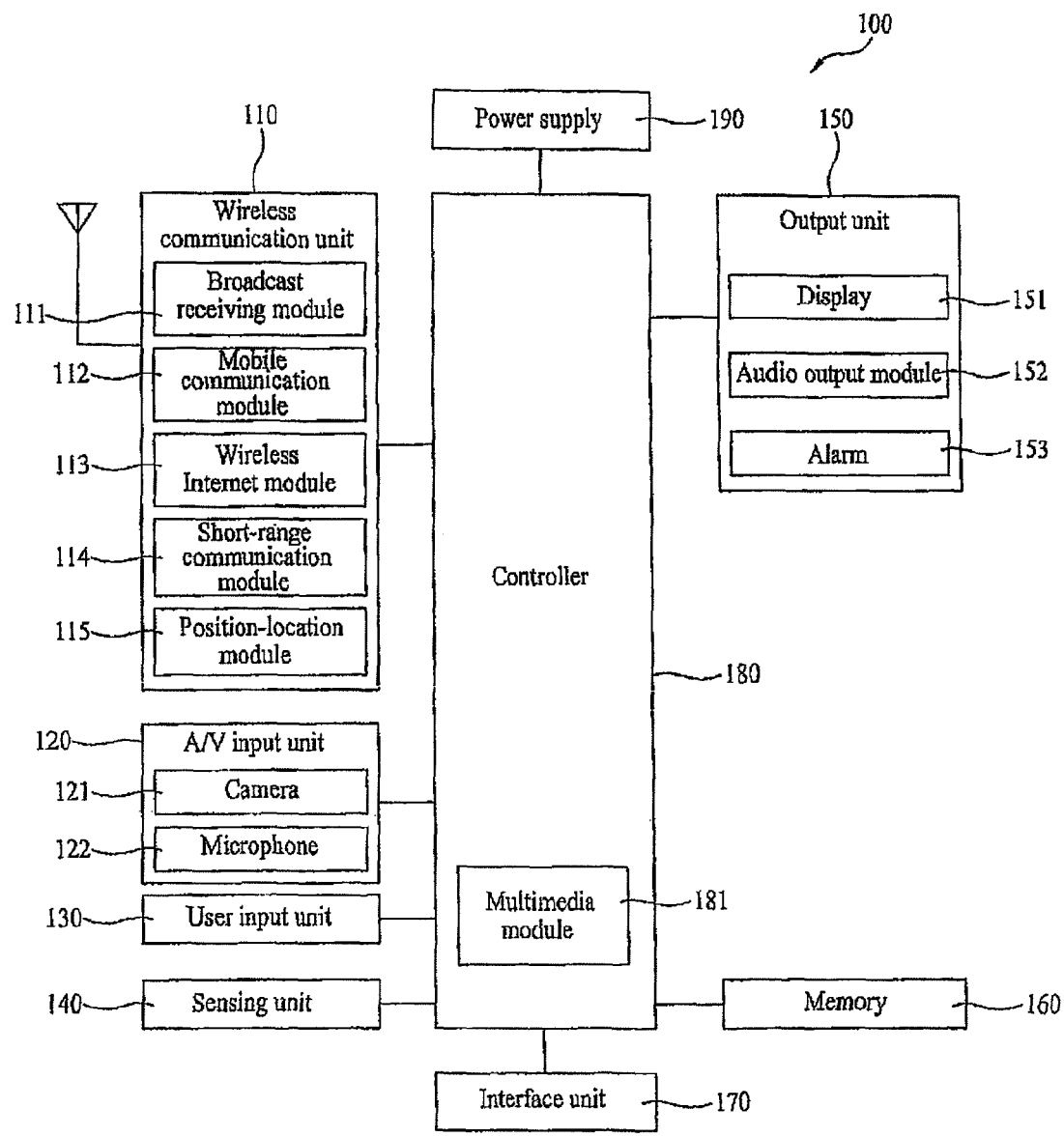
FIG. 1 is a block diagram of a mobile terminal in accordance with an embodiment of the present invention.

FIG. 1 is a block diagram of mobile terminal 100 in accordance with an embodiment of the present invention. The mobile terminal may be implemented using a variety of different types of terminals. Examples of such terminals include mobile as well as non-mobile terminals, such as mobile phones, user equipment, smart phones, computers, digital broadcast terminals, personal digital assistants, portable multimedia players (PMP) and navigators. By way of non-limiting example only, further description will be with regard to a mobile terminal. However, such teachings apply equally to other types of terminals. FIG. 1 shows the mobile terminal 100 having various components, but it is understood that implementing all of the illustrated components is not a requirement. Greater or fewer components may alternatively be implemented.

FIG. 1 shows a wireless communication unit 110 configured with several commonly implemented components. For instance, the wireless communication unit 110 typically includes one or more components which permits wireless communication between the mobile terminal 100 and a wireless communication system or network within which the mobile terminal is located.

The broadcast receiving module 111 receives a broadcast signal and/or broadcast associated information from an external broadcast managing entity via a broadcast channel. The broadcast channel may include a satellite channel and a terrestrial channel. The broadcast managing entity refers generally to a system which transmits a broadcast signal and/or broadcast associated information. Examples of broadcast associated information include information associated with a broadcast channel, a broadcast program, a broadcast service provider, etc. For instance, broadcast associated information may include an electronic program guide (EPG) of digital multimedia broadcasting (DMB) and electronic service guide (ESG) of digital video broadcast-handheld (DVB-H).

The broadcast signal may be implemented as a TV broadcast signal, a radio broadcast signal, and a data broadcast signal, among others. If desired, the broadcast signal may further include a broadcast signal combined with a TV or radio broadcast signal.

The broadcast receiving module 111 may be configured to receive broadcast signals transmitted from various types of broadcast systems. By nonlimiting example, such broadcasting systems include digital multimedia broadcasting-terrestrial (DMB-T), digital multimedia broadcasting-satellite (DMB-S), digital video broadcast-handheld (DVB-H), the data broadcasting system known as media forward link only (MediaFLO®) and integrated services digital broadcast-terrestrial (ISDB-T). Receiving of multicast signals is also possible. If desired, data received by the broadcast receiving module 111 may be stored in a suitable device, such as memory 160. The broadcast receiving module 111 is configured to be compatible with any broadcast system for providing a broadcast signal in addition to the above-mentioned digital broadcast systems.

The mobile communication module 112 transmits/receives wireless signals to/from one or more network entities (e.g., base station, Node-B). Such signals may represent audio, video, multimedia, control signaling, and data, among others.

The wireless internet module 113 supports Internet access for the mobile terminal. This module may be internally or externally coupled to the terminal. Suitable technologies for wireless internet may include, but are not limited to, WLAN (Wireless LAN) (Wi-Fi), Wibro (Wireless broadband), Wimax (World Interoperability for Microwave Access), HSDPA (High Speed Downlink Packet Access).

The short-range communication module 114 facilitates relatively short-range communications. Suitable technologies for short-range communication my include, but are not limited to, radio frequency identification (RFID), infrared data association (IrDA), ultra-wideband (UWB), as well at the networking technologies commonly referred to as Bluetooth and ZigBee, to name a few.

Position-location module 115 identifies or otherwise obtains the location of the mobile terminal. If desired, this module may be implemented using global positioning system (GPS) components which cooperate with associated satellites, network components, and combinations thereof.

Audio/video (A/V) input unit 120 is configured to provide audio or video signal input to the mobile terminal. As shown, the A/V input unit 120 includes a camera 121 and a microphone 122. The camera receives and processes image frames of still pictures or video.

The microphone 122 receives an external audio signal while the portable device is in a particular mode, such as phone call mode, recording mode and voice recognition. This audio signal is processed and converted into digital data. The portable device, and in particular, A/V input unit 120, typically includes assorted noise removing algorithms to remove noise generated in the course of receiving the external audio signal. Data generated by the A/V input unit 120 may be stored in memory 160, utilized by output unit 150, or transmitted via one or more modules of communication unit 110. If desired, two or more microphones and/or cameras may be used.

The user input unit 130 generates input data responsive to user manipulation of an associated input device or devices. Examples of such devices include a keypad, a dome switch, a touchpad (e.g., static pressure/capacitance), a jog wheel and a jog switch. A specific example is one in which the user input unit 130 is configured as a touchpad in cooperation with a touchscreen display (which will be described in more detail below).

The sensing unit 140 provides status measurements of various aspects of the mobile terminal. For instance, the sensing unit may detect an open/close status of the mobile terminal, relative positioning of components (e.g., a display and keypad) of the mobile terminal, a change of position of the mobile terminal or a component of the mobile terminal, a presence or absence of user contact with the mobile terminal, orientation or acceleration/deceleration of the mobile terminal. As an example, consider the mobile terminal 100 being configured as a slide-type mobile terminal. In this configuration, the sensing unit 140 may sense whether a sliding portion of the mobile terminal is open or closed. Other examples include the sensing unit 140 sensing the presence or absence of power provided by the power supply 190, the presence or absence of a coupling or other connection between the interface unit 170 and an external device.

The interface unit 170 is often implemented to couple the mobile terminal with external devices. Typical external devices include wired/wireless headphones, external chargers, power supplies, storage devices configured to store data (e.g., audio, video, pictures, etc.), earphones, and microphones, among others. The interface unit 170 may be configured using a wired/wireless data port, a card socket (e.g., for coupling to a memory card, subscriber identity module (SIM) card, user identity module (UIM) card, removable user identity module (RUIM) card), audio input/output ports and video input/output ports.

The output unit 150 generally includes various components which support the output requirements of the mobile terminal. Display 151 is typically implemented to visually display information associated with the mobile terminal 100. For instance, if the mobile terminal is operating in a phone call mode, the display will generally provide a user interface or graphical user interface which includes information associated with placing, conducting, and terminating a phone call. As another example, if the mobile terminal 100 is in a video call mode or a photographing mode, the display 151 may additionally or alternatively display images which are associated with these modes.

One particular implementation includes the display 151 configured as a touch screen working in cooperation with an input device, such as a touchpad. This configuration permits the display to function both as an output device and an input device.

The display 151 may be implemented using known display technologies including, for example, a liquid crystal display (LCD), a thin film transistor-liquid crystal display (TFT-LCD), an organic light-emitting diode display (OLED), a flexible display and a three-dimensional display. The mobile terminal may include one or more of such displays. An example of a two-display embodiment is one in which one display is configured as an internal display (viewable when the terminal is in an opened position) and a second display configured as an external display (viewable in both the open and closed positions).

FIG. 1 further shows output unit 150 having an audio output module 152 which supports the audio output requirements of the mobile terminal 100. The audio output module is often implemented using one or more speakers, buzzers, other audio producing devices, and combinations thereof The audio output module functions in various modes including call-receiving mode, call-placing mode, recording mode, voice recognition mode and broadcast reception mode. During operation, the audio output module 152 outputs audio relating to a particular function (e.g., call received, message received, and errors).

The output unit 150 is further shown having an alarm 153, which is commonly used to signal or otherwise identify the occurrence of a particular event associated with the mobile terminal. Typical events include call received, message received and user input received. An example of such output includes the providing of tactile sensations (e.g., vibration) to a user. For instance, the alarm 153 may be configured to vibrate responsive to the mobile terminal receiving a call or message. As another example, vibration is provided by alarm 153 responsive to receiving user input at the mobile terminal, thus providing a tactile feedback mechanism. It is understood that the various output provided by the components of output unit 150 may be separately performed, or such output may be performed using any combination of such components.

The memory 160 is generally used to store various types of data to support the processing, control, and storage requirements of the mobile terminal. Examples of such data include program instructions for applications operating on the mobile terminal, contact data, phonebook data, messages, pictures, video, etc. The memory 160 shown in FIG. 1 may be implemented using any type (or combination) of suitable volatile and non-volatile memory or storage devices including random access memory (RAM), static random access memory (SRAM), electrically erasable programmable read-only memory (EEPROM), erasable programmable read-only memory (EPROM), programmable read-only memory (PROM), read-only memory (ROM), magnetic memory, flash memory, magnetic or optical disk, card-type memory, or other similar memory or data storage device.

The controller 180 typically controls the overall operations of the mobile terminal. For instance, the controller performs the control and processing associated with voice calls, data communications, instant message communication, video calls, camera operations and recording operations. If desired, the controller may include a multimedia module 181 which provides multimedia playback. The multimedia module may be configured as part of the controller 180, or this module may be implemented as a separate component.

The power supply 190 provides power required by the various components for the portable device. The provided power may be internal power, external power, or combinations thereof.

Various embodiments described herein may be implemented in a computer-readable medium using, for example, computer software, hardware, or some combination thereof. For a hardware implementation, the embodiments described herein may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a selective combination thereof In some cases, such embodiments are implemented by controller 180.

For a software implementation, the embodiments described herein may be implemented with separate software modules, such as procedures and functions, each of which perform one or more of the functions and operations described herein. The software codes can be implemented with a software application written in any suitable programming language and may be stored in memory (for example, memory 160), and executed by a controller or processor (for example, controller 180).

Mobile terminal 100 may be implemented in a variety of different configurations. Examples of such configurations include folder-type, slide-type, bar-type, rotational-type, swing-type and combinations thereof For clarity, further disclosure will primarily relate to a slide-type mobile terminal. However such teachings apply equally to other types of terminals.

Figure 2:
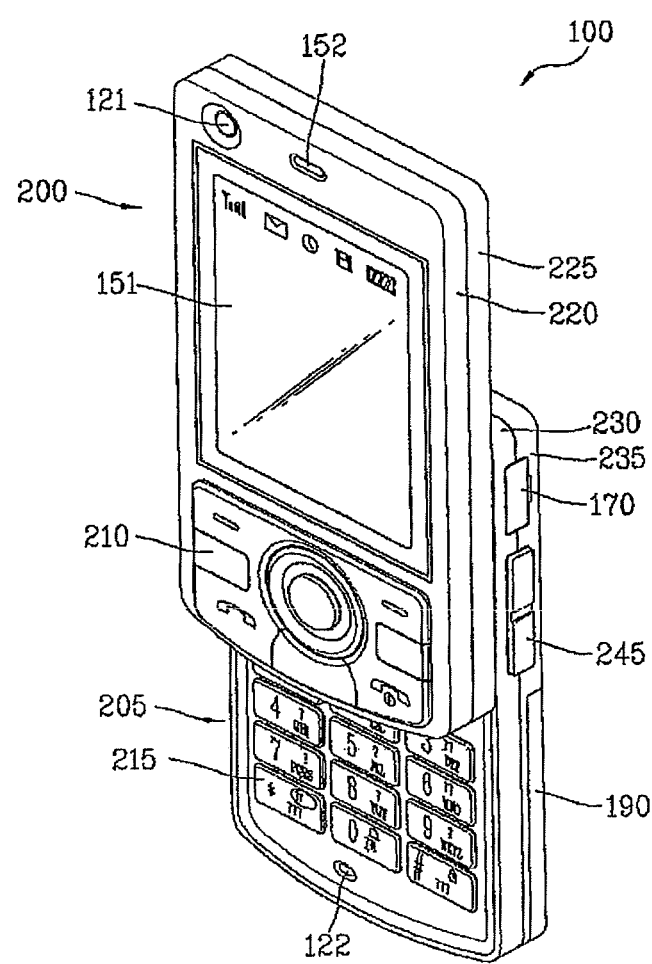
FIG. 2 is a perspective view of a front side of a mobile terminal according to an embodiment of the present invention.

FIG. 2 is a perspective view of a front side of a mobile terminal according to an embodiment of the present invention. In FIG. 2, the mobile terminal 100 is shown having a first body 200 configured to slideably cooperate with a second body 205. The user input unit (described in FIG. 1) may include a first input unit such as the touchpad and function keys 210, a second input unit such as keypad 215 and a third input unit such as side keys 245. The function keys 210 are associated with first body 200, and the keypad 215 is associated with second body 205. The keypad includes various keys (e.g., numbers, characters, and symbols) to enable a user to place a call, prepare a text or multimedia message, and otherwise operate the mobile terminal.

The first body 200 slides relative to second body 205 between open and closed positions. In a closed position, the first body is positioned over the second body in such a manner that the keypad 215 is substantially or completely obscured by the first body 200. In the open position, user access to the keypad 215, as well as the display 151 and function keys 210, is possible. The function keys are convenient to a user for entering commands such as start, stop and scroll.

The mobile terminal 100 is operable in either a standby mode (e.g., able to receive a call or message, receive and respond to network control signaling), or an active call mode. Typically, the mobile terminal 100 functions in a standby mode when in the closed position, and an active mode when in the open position. This mode configuration may be changed as required or desired.

The first body 200 is shown formed from a first case 220 and a second case 225, and the second body 205 is shown formed from a first case 230 and a second case 235. The first and second cases are usually formed from a suitably ridge material such as injection molded plastic, or formed using metallic material such as stainless steel (STS) and titanium (Ti).

If desired, one or more intermediate cases may be provided between the first and second cases of one or both of the first and second bodies 200, 205. The first and second bodies 200, 205 are typically sized to receive electronic components necessary to support operation of the mobile terminal 100.

The first body 200 is shown having a camera 121 and audio output unit 152, which is configured as a speaker, positioned relative to the display 151. If desired, the camera 121 may be constructed in such a manner that it can be selectively positioned (e.g., rotated, swiveled, etc.) relative to first body 200.

The function keys 210 are positioned adjacent to a lower side of the display 151. The display 151 is shown implemented as an LCD or OLED. Recall that the display may also be configured as a touchscreen having an underlying touchpad which generates signals responsive to user contact (e.g., finger, stylus, etc.) with the touchscreen.

Second body 205 is shown having a microphone 122 positioned adjacent to keypad 215, and side keys 245, which are one type of a user input unit, positioned along the side of second body 205. Preferably, the side keys 245 may be configured as hot keys, such that the side keys are associated with a particular function of the mobile terminal. An interface unit 170 is shown positioned adjacent to the side keys 245, and a power supply 190 in a form of a battery is located on a lower portion of the second body 205.

Figure 3:
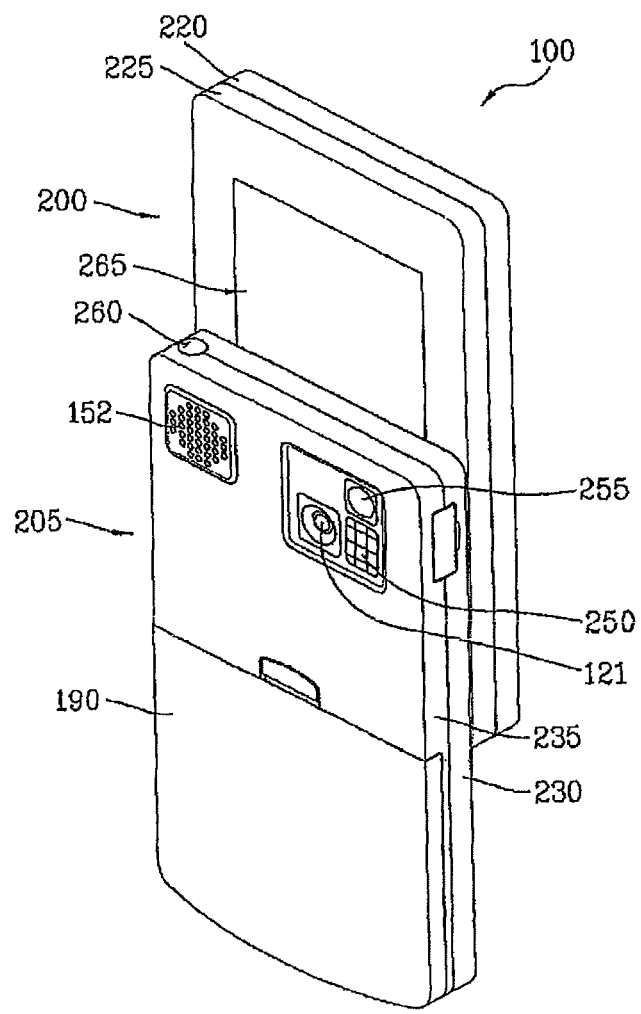
FIG. 3 is a rear view of the mobile terminal shown in FIG. 2.

FIG. 3 is a rear view of the mobile terminal shown in FIG. 2. FIG. 3 shows the second body 205 having a camera 121, and an associated flash 250 and mirror 255. The flash operates in conjunction with the camera 121 of the second body. The mirror 255 is useful for assisting a user to position camera 121 in a self-portrait mode. The camera 121 of the second body faces a direction which is opposite to a direction faced by camera 121 of the first body 200 (FIG. 2). Each of the cameras 121 of the first and second bodies may have the same or different capabilities.

In an embodiment, the camera of the first body 200 operates with a relatively lower resolution than the camera of the second body 205. Such an arrangement works well during a video conference, for example, in which reverse link bandwidth capabilities may be limited. The relatively higher resolution of the camera of the second body 205 (FIG. 3) is useful for obtaining higher quality pictures for later use or for communicating to others.

The second body 205 also includes an audio output module 152 configured as a speaker, and which is located on an upper side of the second body. If desired, the audio output modules of the first and second bodies 200, 205, may cooperate to provide stereo output. Moreover, either or both of these audio output modules may be configured to operate as a speakerphone.

A broadcast signal receiving antenna 260 is shown located at an upper end of the second body 205. Antenna 260 functions in cooperation with the broadcast receiving module 111 (FIG. 1). If desired, the antenna 260 may be fixed or configured to retract into the second body 205. The rear side of the first body 200 includes slide module 265, which slideably couples with a corresponding slide module located on the front side of the second body 205.

It is understood that the illustrated arrangement of the various components of the first and second bodies 200, 205, may be modified as required or desired. In general, some or all of the components of one body may alternatively be implemented on the other body. In addition, the location and relative positioning of such components are not critical to many embodiments, and as such, the components may be positioned at locations which differ from those shown by the representative figures.

The mobile terminal 100 of FIGS. 1-3 may be configured to operate within a communication system which transmits data via frames or packets, including both wireless and wireline communication systems, and satellite-based communication systems. Such communication systems utilize different air interfaces and/or physical layers.

Examples of such air interfaces utilized by the communication systems include example, frequency division multiple access (FDMA), time division multiple access (TDMA), code division multiple access (CDMA), and universal mobile telecommunications system (UMTS), the long term evolution (LTE) of the UMTS, and the global system for mobile communications (GSM). By way of non-limiting example only, further description will relate to a CDMA communication system, but such teachings apply equally to other system types.

Figure 4:
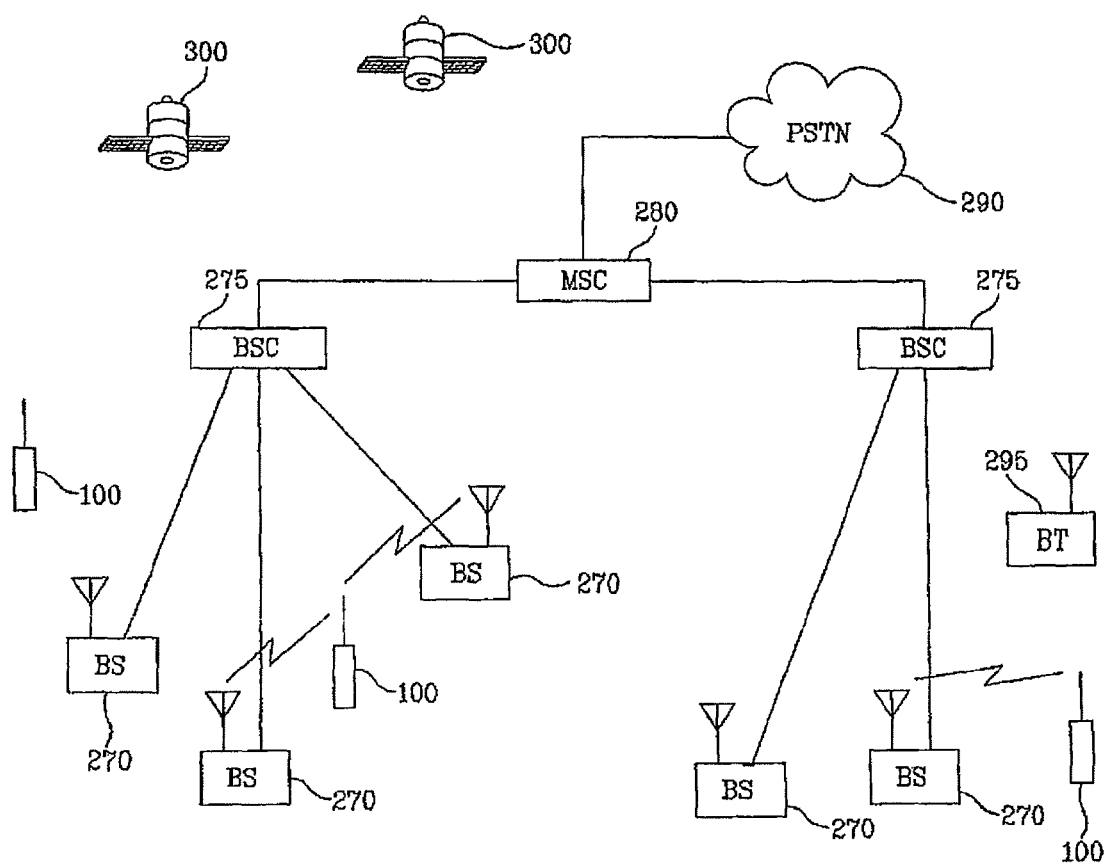
FIG. 4 is a block diagram of a CDMA wireless communication system operable with the mobile terminal of FIGS. 1 to 3.

Referring now to FIG. 4, a CDMA wireless communication system is shown having a plurality of mobile terminals 100, a plurality of base stations 270, base station controllers (BSCs) 275, and a mobile switching center (MSC) 280. The MSC 280 is configured to interface with a conventional public switch telephone network (PSTN) 290. The MSC 280 is also configured to interface with the BSCs 275. The BSCs 275 are coupled to the base stations 270 via backhaul lines. The backhaul lines may be configured in accordance with any of several known interfaces including, for example, E1/T1, ATM, IP, PPP, Frame Relay, HDSL, ADSL, or xDSL. It is to be understood that the system may include more than two BSCs 275.

Each base station 270 may include one or more sectors, each sector having an omnidirectional antenna or an antenna pointed in a particular direction radially away from the base station 270. Alternatively, each sector may include two antennas for diversity reception. Each base station 270 may be configured to support a plurality of frequency assignments, with each frequency assignment having a particular spectrum (e.g., 1.25 MHz, 5 MHz).

The intersection of a sector and frequency assignment may be referred to as a CDMA channel. The base stations 270 may also be referred to as base station transceiver subsystems (BTSs). In some cases, the term "base station" may be used to refer collectively to a BSC 275, and one or more base stations 270. The base stations may also be denoted "cell sites." Alternatively, individual sectors of a given base station 270 may be referred to as cell sites.

A terrestrial digital multimedia broadcasting (DMB) transmitter 295 is shown broadcasting to portable terminals 100 operating within the system. The broadcast receiving module 111 (FIG. 1) of the portable terminal is typically configured to receive broadcast signals transmitted by the DMB transmitter 295. Similar arrangements may be implemented for other types of broadcast and multicast signaling (as discussed above).

FIG. 4 further depicts several global positioning system (GPS) satellites 300. Such satellites facilitate locating the position of some or all of the portable terminals 100. Two satellites are depicted, but it is understood that useful positioning information may be obtained with greater or fewer satellites. The position-location module 115 (FIG. 1) of the portable terminal 100 is typically configured to cooperate with the satellites 300 to obtain desired position information. It is to be appreciated that other types of position detection technology, (i.e., location technology that may be used in addition to or instead of GPS location technology) may alternatively be implemented. If desired, some or all of the GPS satellites 300 may alternatively or additionally be configured to provide satellite DMB transmissions.

During typical operation of the wireless communication system, the base stations 270 receive sets of reverse-link signals from various mobile terminals 100. The mobile terminals 100 are engaging in calls, messaging, and other communications. Each reverse-link signal received by a given base station 270 is processed within that base station. The resulting data is forwarded to an associated BSC 275. The BSC provides call resource allocation and mobility management functionality including the orchestration of soft handoffs between base stations 270. The BSCs 275 also route the received data to the MSC 280, which provides additional routing services for interfacing with the PSTN 290. Similarly, the PSTN interfaces with the MSC 280, and the MSC interfaces with the BSCs 275, which in turn control the base stations 270 to transmit sets of forward-link signals to the mobile terminals 100.

In the following description, a controlling method implemented in the above-configured will be explained per an embodiment. It is to be understood that each of the following embodiments can be implemented independently or that the present invention may be performed using any combination of such embodiments.

In the following description, it is assumed that the mobile terminal includes the slider type terminal including the first and second bodies. In particular, the first body 200 is a main body and the second body 205 is a slider that slides on the main body. And, it is also to be understood that the present invention is applicable to but not limited to a folder type terminal, a swing type terminal and the like as well as the slider type terminal.

First Embodiment

A method of controlling a mobile terminal according to a first embodiment of the present invention is explained with reference to FIG. 5 and FIG. 6 as follows.

Figure 5:
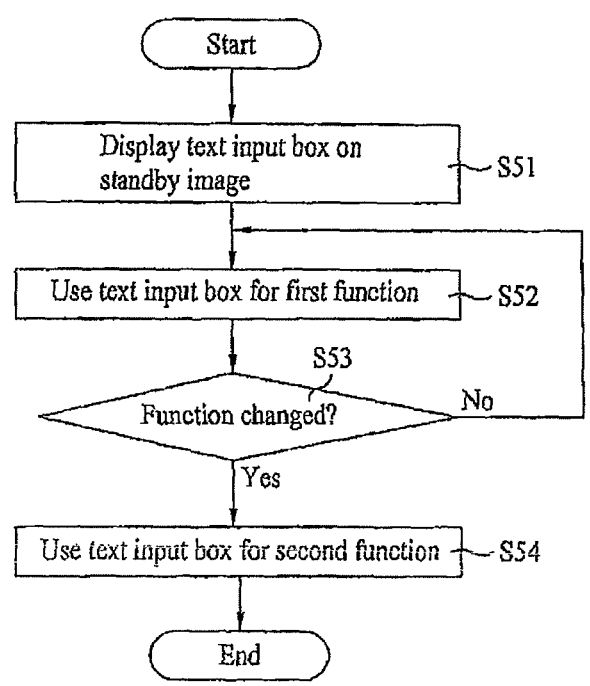
FIG. 5 is a flowchart for a method of controlling a mobile terminal according to a first embodiment of the present invention.
Figure 6:
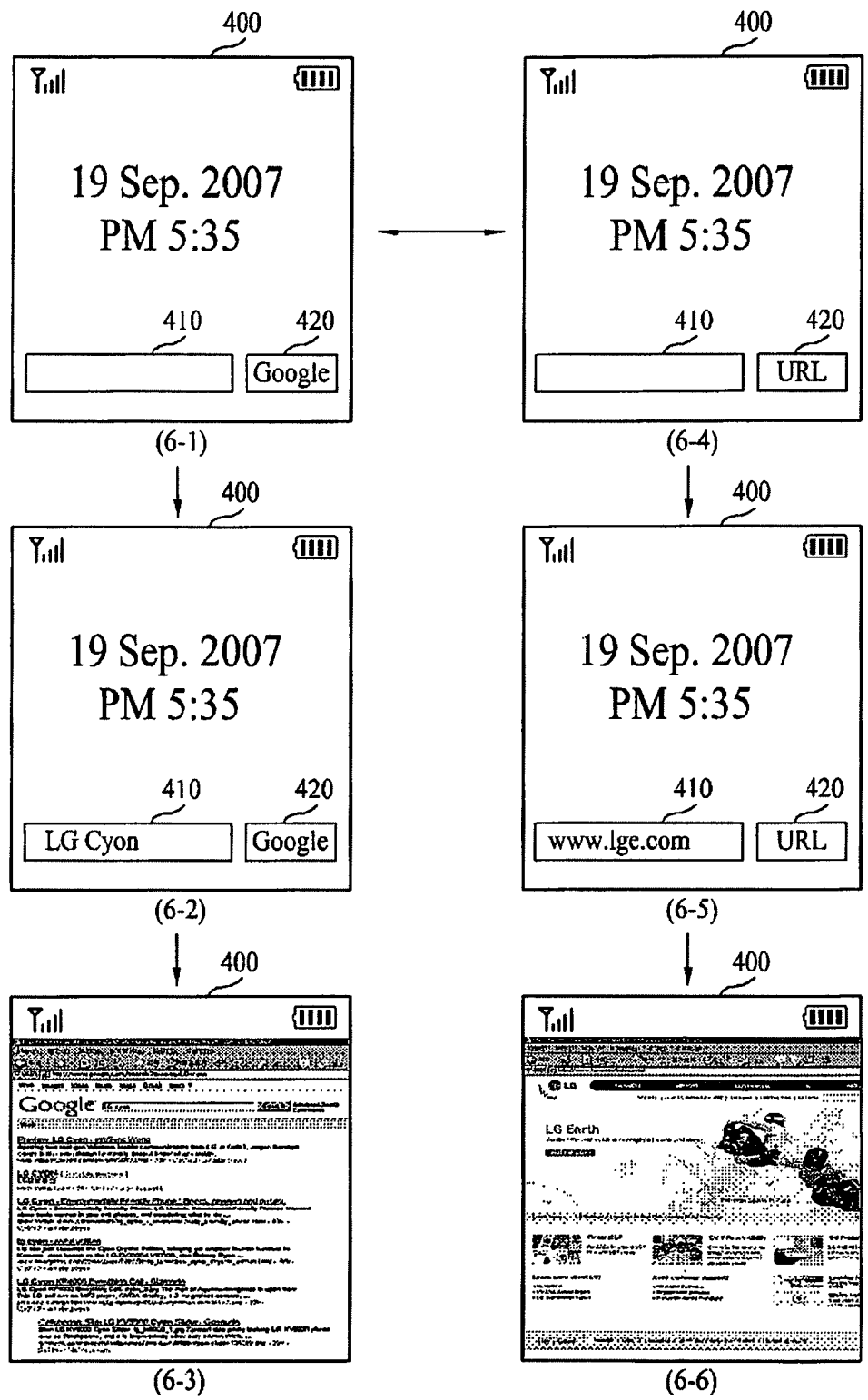
FIG. 6 is a diagram of a display screen on which a method of controlling a mobile terminal according to a first embodiment of the present invention is implemented.

FIG. 5 is a flowchart for a method of controlling a mobile terminal according to a first embodiment of the present invention, and FIG. 6 is a diagram of a display screen on which a method of controlling a mobile terminal according to a first embodiment of the present invention is implemented.

Referring to (6-1) of FIG. 6, a standby image is displayed on a touchscreen 400 of the mobile terminal 100. And, a text input box 410 is displayed on the standby image [S51]. A standby image is an image displayed when the device is in a standby state (e.g., awaiting a user input).

The text input box 410 is usable for at least two functions. Details of the first and second functions will be explained later in this disclosure.

An indicator 420 indicating which one of the first and second functions is used for the text input box 410 is displayed on the standby image [S52].

In case that the display module 151 of the mobile terminal 100 does not include a touchscreen, it is able to configure the first and second functions, as shown in (6-1) and (6-2) of FIG. 6, to be mutually switched each other via a corresponding key manipulation (e.g., soft key manipulation) of the user input unit [S53, S54].

In case that the display module 151 of the mobile terminal 100 is configured to operate as a touchscreen in a manner of constructing a mutual layer structure with the touchpad, it is able to configure the first and second functions, as shown in (6-1) and (6-4) of FIG. 6, to be mutually switched to each other by having the indicator 420 touched (e.g., long touch). In this case, the indicator 420 plays a role as a toggle switch type selector to select either the first function or the second function [S53, S54].

In the following description, it is assumed that the display module 151 operates as a touchscreen.

In (6-1) of FIG. 6, depicted is an example that the text input box 410 is in progress of the first function, e.g., a search function (e.g., a Google™ search function).

For the search function, a terminal user selects the text input box 410, for example by touching the text input box 410.

Subsequently, a prescribed search word, as shown in (6-2) of FIG. 6, is inputted to the text input box 410 via the user input unit 130. It can be considered that when the text input box 410 is selected, a virtual keypad is created on the touchscreen, and the search word is inputted via the created virtual keypad.

After the search word has been inputted, if a command for executing a search for the search word is inputted, a result of the search corresponding to the search word, as shown in (6-3) of FIG. 6, is displayed.

The execution command for the search can be carried out by a corresponding key manipulation (e.g., soft key manipulation) of the user input unit or by a touch of the indicator (e.g., short touch).

Meanwhile, a case of attempting to use the text input box 410 for the second function, e.g., an internet address input function (e.g., internet URL (uniform resource locator) input function) is explained as follows.

On the touchscreen 400 shown in (6-1) of FIG. 6, a terminal user makes a long touch to the indicator 420. If so, the text input box is switched for the second function. The indicator 420, as shown in (6-4) of FIG. 6, indicates that the text input box 410 is usable for the internet URL input function.

Subsequently, a prescribed internet URL, as shown in (6-5) of FIG. 6, is inputted to the text input box 410 via the user input unit 130. It can be considered that when the text input box 410 is selected, a virtual keypad is created on the touchscreen, and the internet URL is inputted via the created virtual keypad.

After completion of the internet URL input, if a command for executing an entry to the internet URL is inputted, a webpage, as shown in (6-6) of FIG. 6, corresponding to the internet URL is displayed.

The command for the entry to the internet URL can be carried out via a corresponding key manipulation (e.g., soft key manipulation) of the user input unit 130 or a touch (e.g., short touch) of the indicator 420.

The above-explained first and second functions are not limited to the search function and the internet URL input function, respectively. For the first and second functions, two functions can be selected from the group consisting of a first preset website search function, a second preset website search function, an internet address input function, a calculator function, and a file search function within a terminal.

In addition to the previously described embodiments, it is possible for the controller to be configured to distinguish between at least two input pattern types input into the text box, and to automatically select one of the at least two different information access functions based upon a distinguished pattern type. If pattern ambiguous, the controller is further configured to display a option selection screen (e.g, a pop-up window, a drop-down box, a dialog box or another option selection screen).

In addition, whereas the previous description describes the use of a standby image, it is not necessary that the text input box and the indicator to be displayed on a standby image. In such a case, the text input box and the indicator may be displayed on a blank (colored or not) screen.

Also, the indicator need not be a text icon as shown in the figures. In options not shown in the figures, the indicator may be one of a color of the text box, a location of the text box within the display, or a non-text image. For example, a red text box may correspond to a URL entry box, whereas a yellow text box may correspond to a phonebook or web search. Also, a box displayed on a top of the screen may correspond to a URL entry box, whereas a box displayed on a top of the screen may correspond to a phonebook or web search. Also, a displayed first symbol (e.g., a globe) correspond to a URL entry box, whereas a displayed second symbol (e.g., a phone) may correspond to a phonebook search.

Second Embodiment

A method of controlling a mobile terminal according to a second embodiment of the present invention is explained with reference to FIG. 7 and FIG. 8 as follows.

Figure 7:
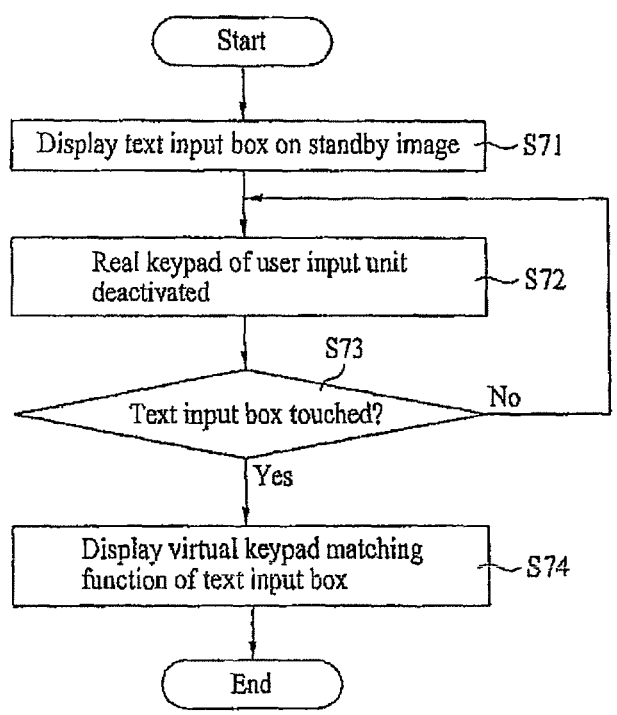
FIG. 7 is a flowchart for a method of controlling a mobile terminal according to a second embodiment of the present invention.
Figure 8:
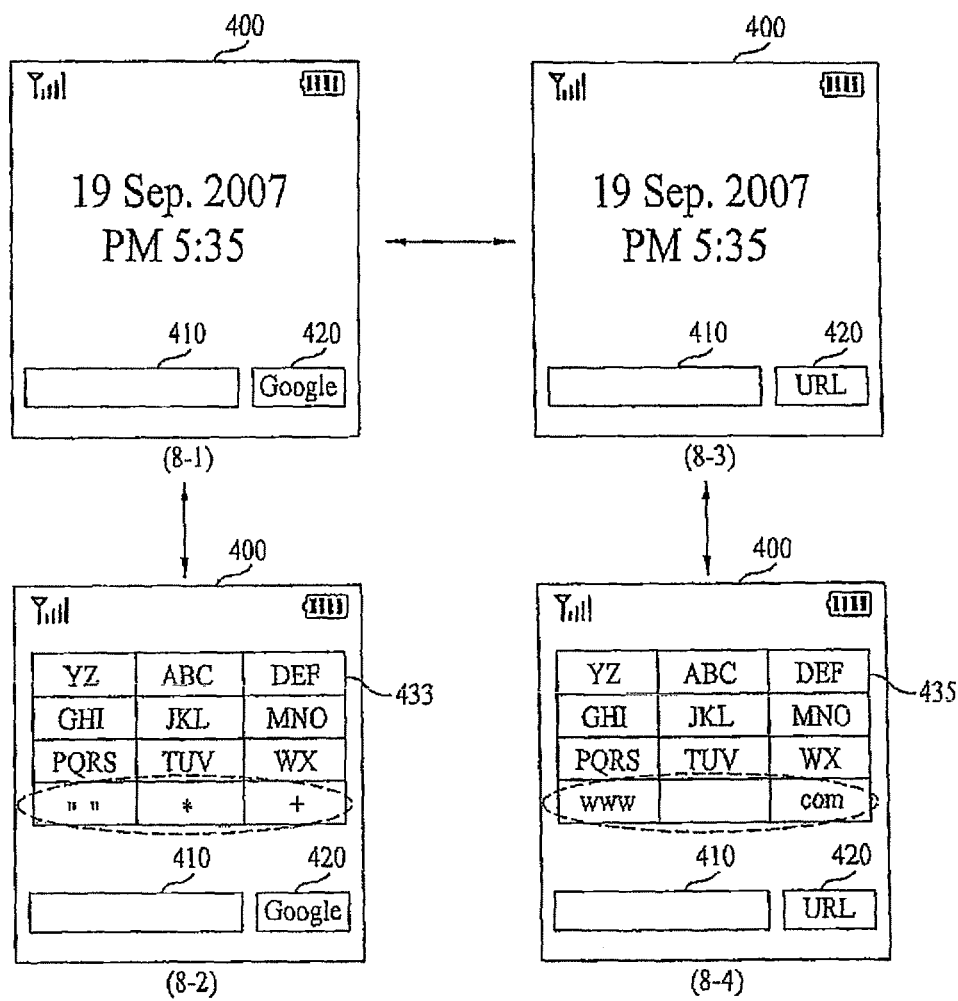
FIG. 8 is a diagram of a display screen on which a method of controlling a mobile terminal according to a second embodiment of the present invention is implemented.

FIG. 7 is a flowchart for a method of controlling a mobile terminal according to a second embodiment of the present invention, and FIG. 8 is a diagram of a display screen on which a method of controlling a mobile terminal according to a second embodiment of the present invention is implemented.

Referring to (8-1) of FIG. 8, a text input box 410 for a search function is presented in a standby image displayed on the touchscreen 400 [S71]. And, an indicator 420 indicating that the text input box 410 is used for search is displayed together with the text input box 410.

While the mobile terminal 100 is in a closed position, a real keypad for a text input of the user input unit 130 is not externally exposed. So, the real keypad may be in a deactivated mode [S72].

If the text input box 410 is selected, a virtual keypad 433, as shown in (8-2) of FIG. 8, is created on the touchscreen [S73, S74]. Hence, a terminal user is able to input a search word via the created virtual keypad.

Optionally, it is able to configure the created virtual keypad to automatically disappear from the touchscreen if the real keypad of the user input unit is in an active mode (e.g., the real keypad is externally exposed since the mobile terminal is in an open position).

Referring to (8-3) of FIG. 8, the text input box 410 for an internet address input function is presented on a standby image displayed on the touchscreen 400. And, an indicator 420 indicating that the text input box 410 is used for the internet address input function is displayed together with the text input box 410.

If the text input box 410 is selected and the real keypad, as shown in (8-4) of FIG. 8, becomes deactivated, a virtual keypad 435 is created on the touchscreen 400.

The virtual keypad 435 shown in (8-4) of FIG. 8 needs not to be identical to the virtual keypad 435 shown in (8-2) of FIG. 8. Namely, the device is able to configure the created virtual keypads to differ at least in part from each other to be most suitable for each of the functions used for the text input box, respectively.

For instance, the virtual keypad 435 shown in (8-4) of FIG. 8 can be provided with such a key button facilitating an internet address input as 'www', 'com' and the like.

Third Embodiment

In the first embodiment of the present invention, a single text input box is presented in the standby image and the text input box is usable for two functions. The present invention is further applicable to the case that the text input box is usable for at least three functions. This is explained as a third embodiment of the present invention with reference to FIG. 9.

Figure 9:
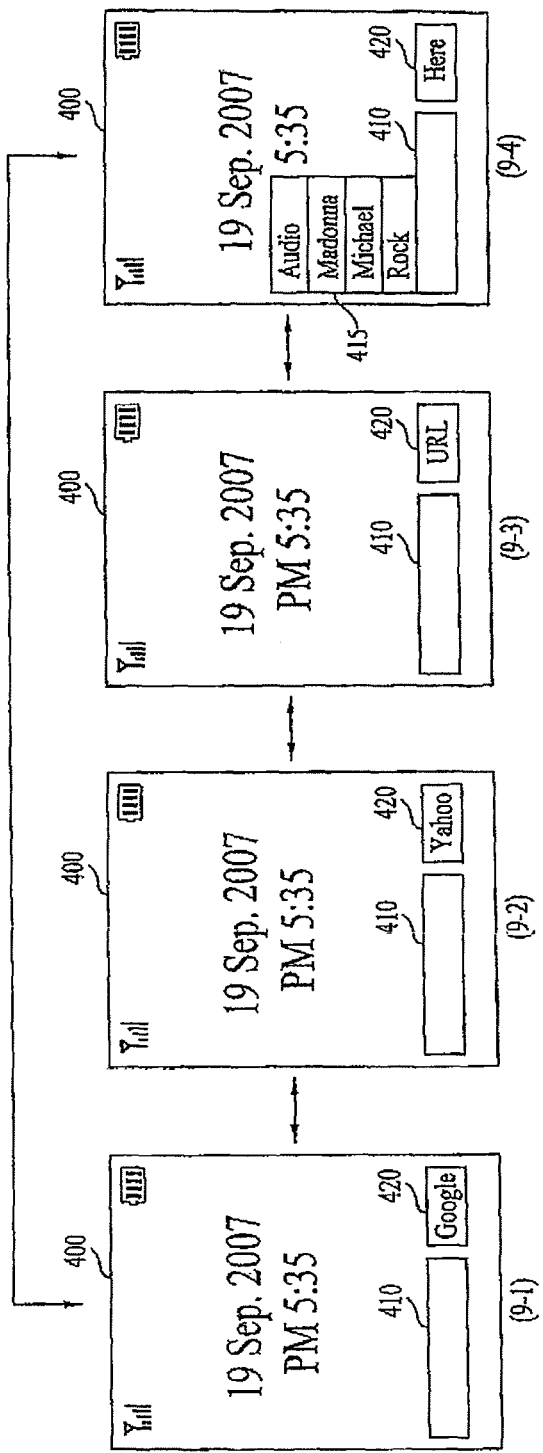
FIG. 9 is a diagram of a display screen on which a method of controlling a mobile terminal according to a third embodiment of the present invention is implemented.

FIG. 9 is a diagram of a display screen on which a method of controlling a mobile terminal according to a third embodiment of the present invention is implemented.

Referring to (9-1) of FIG. 9, a text input box 410 is presented in a standby image displayed on the display screen 400 of the mobile terminal 100. And, an indicator 420 indicating a function for which the text input box 410 will be used is displayed on the display screen 400 together with the text input box 410. In (9-1) of FIG. 9, the indicator 420 indicates that the text input box 410 is usable for a first function (e.g., a first preset website search function).

If a long touch is made to the indicator 420 or if a corresponding key manipulation is carried out on the user input unit 140, the indicator 420, as shown in (9-2) of FIG. 9, indicates that the text input box 410 is usable for a second function (e.g., a second preset website search function).

Similarly, whenever a long touch is made to the indicator 420 or each time a corresponding key manipulation is carried out on the user input unit 140, the indicator 420, as shown in (9-3)/(9-4) of FIG. 9, indicates that the text input box 410 is us usable for a third/fourth function. In this case, a third function may include an internet address input function and a fourth function may include a file search function within a terminal.

So, by making a long touch to the indicator 420 or performing a corresponding key manipulation on the user input unit 130 until a necessary function is assigned to the text input box 410, a terminal user is able to change a function of the text input box.

Referring to (9-4) of FIG. 9, if the text input box 410 is double touched for example, it may be able to display a list 415 of texts recently inputted to the text input box 410.

And, it may able to preset the number of functions used for the text input box 410 via a menu manipulation of the mobile terminal.

Fourth Embodiment

In the above description, a function to be used for the text input box 410 is changed if the indicator 420 is just touched. The present invention enables the function to be changed in various ways. This example is explained as a fourth embodiment of the present invention with reference to FIGS. 10 to 14.

FIGS. 10 to 14 are diagrams of a display screen on which a method of controlling a mobile terminal according to a fourth embodiment of the present invention is implemented.

Figure 10:
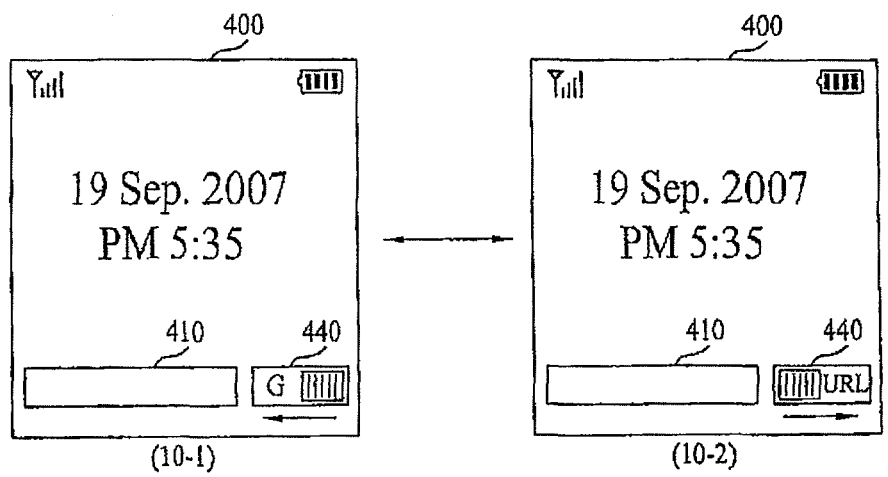
FIGS. 10 to 14 are diagrams of a display screen on which a method of controlling a mobile terminal according to a fourth embodiment of the present invention is implemented.

Like the descriptions of the first to third embodiments of the present invention, FIG. 10 shows that a text input box 410 and an indicator 440 are displayed. Yet, the indicator 440 shown in FIG. 10 is configured in a slide switch type different from the former indicator 420 of the first to third embodiments.

Referring to (10-1) of FIG. 10, the indicator 440 indicates that a function used for the text input box is a Google search function for example.

If a slide switch within the indicator 440 is touched and dragged left, a function for the text input box, as shown in (10-2) of FIG. 10, is changed into an internet address input function. And, the indicator 440 indicates that the text input box is usable for an internet address input.

Figure 11:
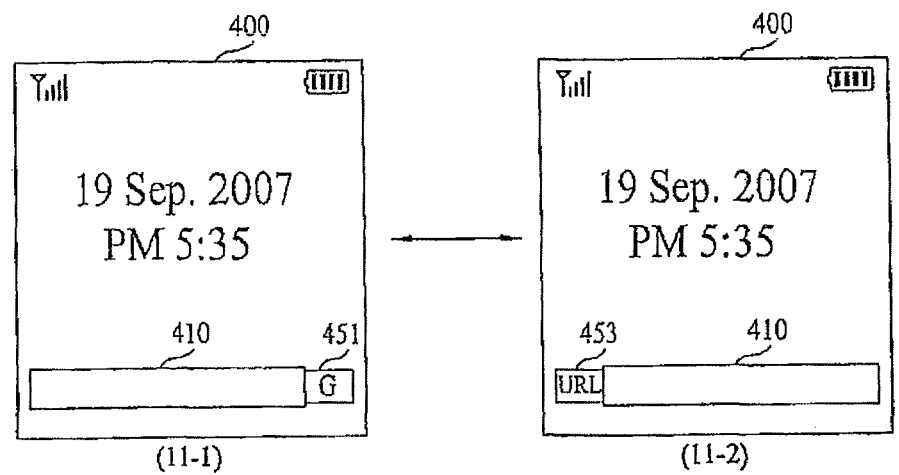

FIG. 11 shows that the text input box 410 itself is used as a slider switch.

Referring to (11-1) of FIG. 11, a portion 451 of the indicator is displayed right to the text input box 410. The portion 451 of the indicator indicates that the text input box 410 is usable in association with Google search.

If the text input box 410 itself is touched and dragged right, the text input box 410, as shown in (11-2) of FIG. 11, covers the portion 451 of the indicator and moves to expose a different portion 453 of the indicator.

The different portion 453 of the exposed indicator indicates that the text input box 410 undergoes a function change to be usable in association with an internet URL input.

Figure 12:
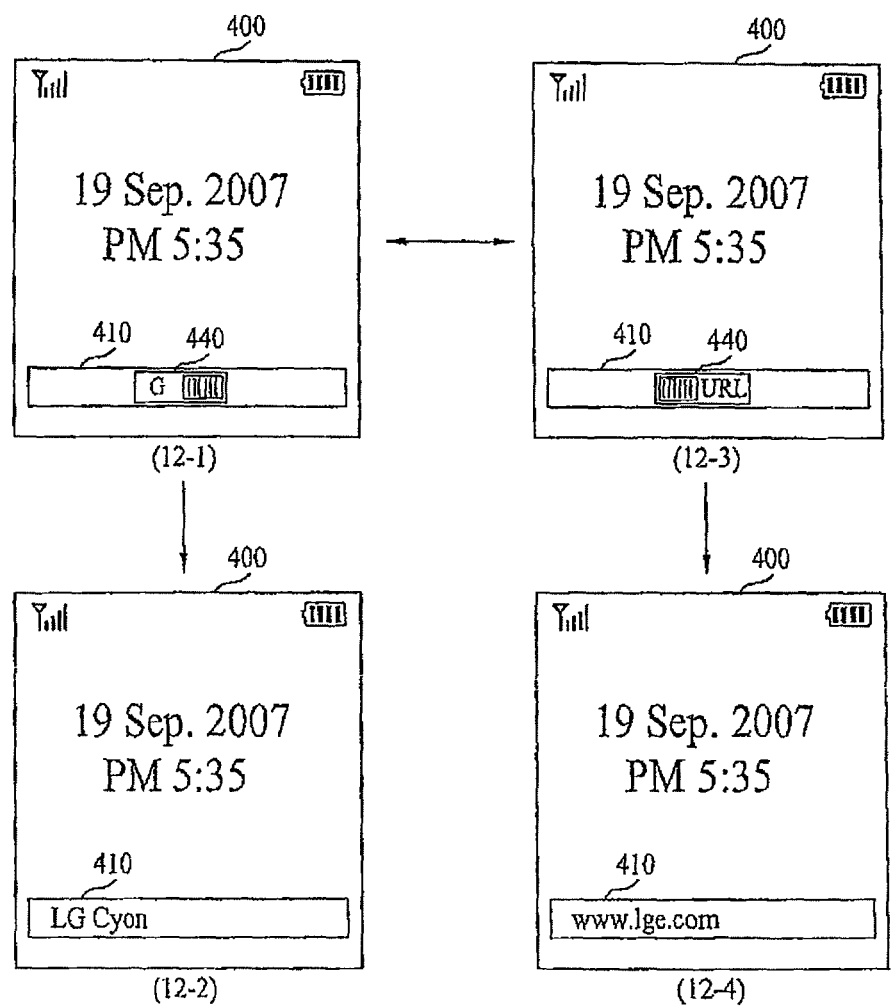

Referring to (12-1) or (12-3) of FIG. 12, the indicator 440 shown in FIG. 10 is provided within the text input box 410 shown in FIG. 10, whereby both of the indicator 440 and the text input box 410 can be built in one body. So, if a text is inputted to the text input box 410, it is able to configure the indicator 440, as shown in (12-2) or (12-4) of FIG. 12, to disappear. This can be easily understood from the description of FIG. 10 without additional explanation. So, details will be omitted in the following description for clarity. Alternatively, it is able to modify the configuration in a manner that both of the indicator 440 and the text input box 410 to be built in one body by providing the indicator 440 shown in FIG. 6 within the text input box 410 shown in FIG. 6.

Figure 13:
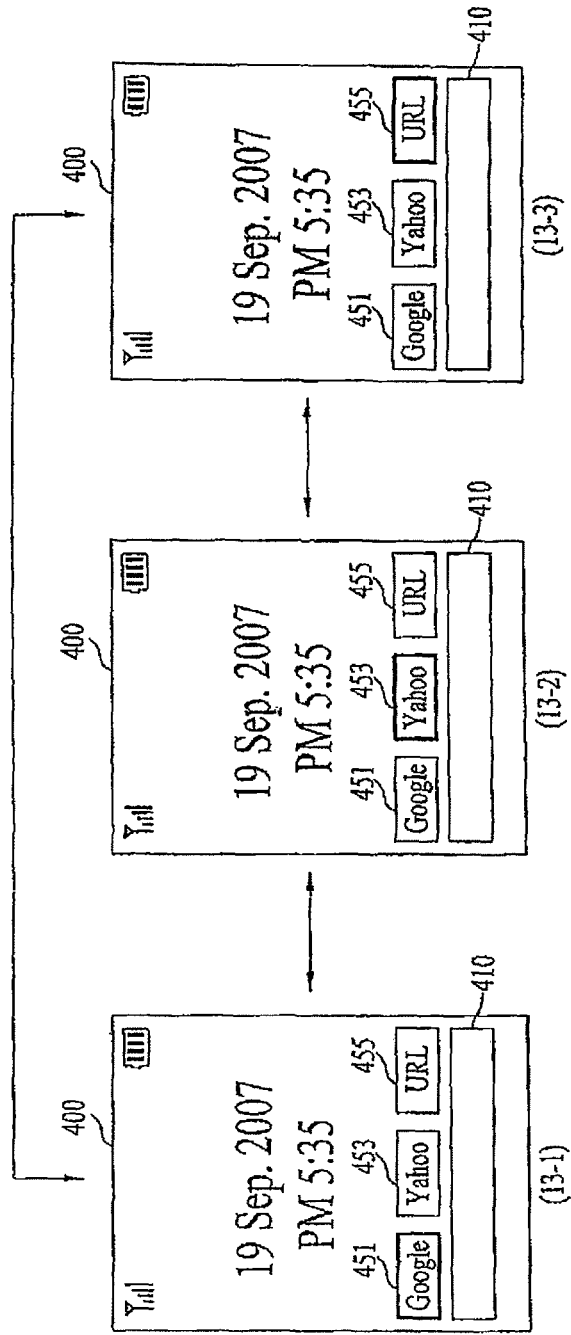

Referring to (13-1) or (13-3) of FIG. 13, a text input filed 410 and a plurality of indicators 451, 453 and 455 respectively indicating functions of the text input field are simultaneously presented in a standby image displayed on a screen. One of a plurality of the indicators is displayed to be visually discriminated from the rest of the indicators. So, a terminal is facilitated to recognize that the text input filed 410 is usable for the function corresponding to the visually discriminated indicator. The terminal user views a plurality of the indicators at a glance, thereby understanding the functions usable for the text input field intuitively.

Figure 14:
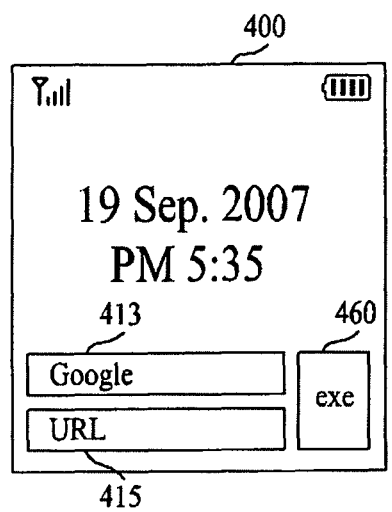

FIG. 14 shows that at least two text input boxes 413 and 415 usable for different function are presented in a standby image displayed on a screen of the mobile terminal.

Referring to FIG. 14, an execution icon 460 is provided next to the text input boxes 413 and 415 to give a command for executing the function relevant to a text inputted to the corresponding text input box 413/415.

Fifth Embodiment

In the above description, the text input box and the indicator corresponding to the text input box are presented in the standby image displayed on the screen. And, it is able to further configure the present invention in a manner that the text input box and the corresponding indicator are implemented on a web browser. This is explained as a fifth embodiment of the present invention with reference to FIG. 15.

Figure 15:
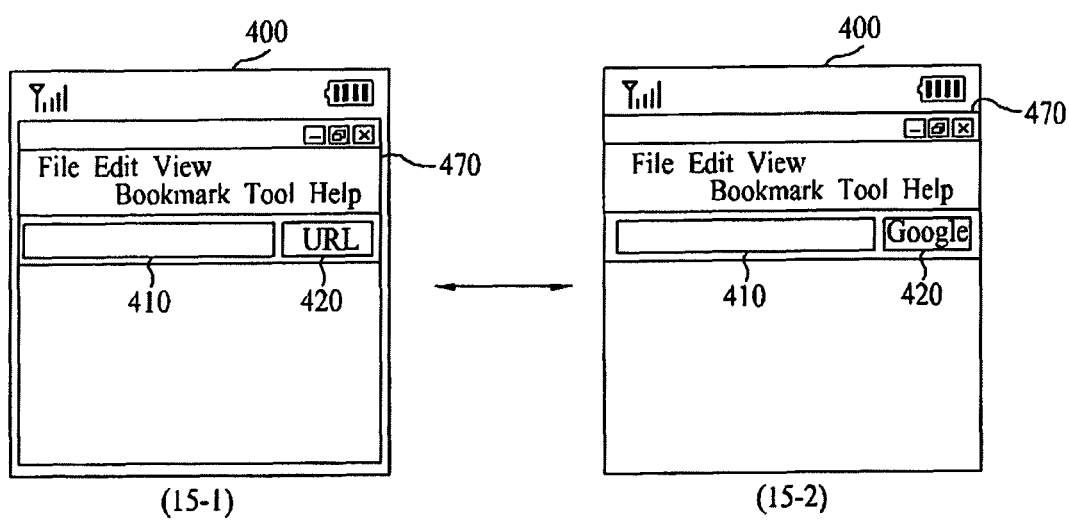
FIG. 15 is a diagram of a display screen on which a method of controlling a mobile terminal according to a fifth embodiment of the present invention is implemented.

FIG. 15 is a diagram of a display screen on which a method of controlling a mobile terminal according to a fifth embodiment of the present invention is implemented.

Referring to (15-1) of FIG. 15, a web browser for an internet access is displayed on a display screen 400 of the mobile terminal 100.

And, a text input box 410 and a corresponding indicator 420, which are as good as those of the first to fourth embodiments of the present invention, are displayed on the web browser.

Hence, a terminal user enables the web browser to display a webpage of a specific internet URL by inputting the specific internet URL to the text input box 410 in the state shown in (15-1) of FIG. 15 [cf. (6-6) of FIG. 6].

Meanwhile, the terminal user makes a long touch to the indicator 420 for example, thereby enabling the text input box, as shown in (15-2) of FIG. 15, to operate as a search text input box of a specific search engine (e.g., Google).

Hence, if the terminal user inputs a specific search word text to the text input box shown in (15-2) of FIG. 15 regardless of what kind of webpage the web browser displays, the web browser displays a result from searching with the search word text in the specific search engine [cf. (6-3) of FIG. 6].

Accordingly, the present invention provides the following effects or advantages.

First of all, according to the present invention, a text input box usable for at least two functions is displayed on a standby image of a mobile terminal or a web browser. Hence, a terminal user is able to directly input a specific text to the text input box on the standby image or web browser in accordance with a specific function.

Secondly, according to the present invention, a text input box and a virtual keypad matching a function of the text input box are displayed on a standby image of a mobile terminal or a web browser. Hence, a terminal user is facilitated to input a specific text to the text input box using the virtual keypad.

It will be apparent to those skilled in the art that various modifications and variations can be made in the present invention without departing from the spirit or scope of the inventions. For instance, the above-described methods can be implemented in a program recorded medium as computer-readable codes. The computer-readable media include all kinds of recording devices in which data readable by a computer system are stored. The computer-readable media include ROM, RAM, CD-ROM, magnetic tapes, floppy discs, optical data storage devices, and the like for example and also include carrier-wave type implementations (e.g., transmission via Internet). And, the computer can include the control unit 180 of the terminal. Thus, it is intended that the present invention covers the modifications and variations of this invention provided they come within the scope of the appended claims and their equivalents.

What is claimed is:

1. A broadcast receiver, comprising:
a display unit;
a communication unit configured to establish an Internet access and receive a broadcast; and
a control unit configured to:
display the received broadcast on the display unit,
display a text input box on the received broadcast,
receive a second type of input selection on a first category object to determine a first display mode for the control unit,
responsive to receiving the second type of input selection on the first category object, display the first display mode,
receive a second type of input selection on a second category object to determine a second display mode for the control unit, and
responsive to receiving the second type of input selection on the second category object, displaying the second display mode, wherein
the first display mode comprises display of the first category object for performing a first function using text in the text input box, and a first virtual keypad with a first set of virtual text input keys that are configured to match with the first category object, so that in the first display mode, the control unit is configured to:
receive text input in the text input box,
receive a first type of input selection on the first category object for performing the first function, and
display first results of the performed first function on the display unit, based on the received first type of input selection, and wherein
the second display mode comprises display of a second category object for performing a second function using text in the text input box, and a second virtual keypad with a second set of virtual text input keys that are configured to match with the second category object, so that in the second display mode, the control unit is configured to:
receive text input in the text input box,
receive the first type of input selection on the second category object for performing the second function, and
display second results of the performed second function on the display unit, based on the received first type of input selection,
wherein the first function is a first search function for searching a first preset website using the text in the text input box, and the second function is an Internet access function for accessing an Internet address in the text input box; and wherein
the display of the first category object with the first virtual keypad and the display of the second category object with the second virtual keypad are mutually exclusive, so that the display unit displays either the first category object with the first virtual keypad or the second category object with the second virtual keypad, and not both the first category object and the second category object,
the display of the first category object is coupled with the first virtual keypad, so that when the first category object is displayed, the first virtual keypad is also displayed, and when the first virtual keypad is displayed, the first category object is also displayed, and
the display of the second category object is coupled with the second virtual keypad, so that when the second category object is displayed, the second virtual keypad is also displayed, and when the second virtual keypad is displayed, the second category object is also displayed.

2. The broadcast receiver of claim 1, wherein the control unit is further configured to differently display the first category object from the second category object.

3. The broadcast receiver of claim 1, wherein when the text input box is selected for inputting text therein, the control unit is further configured to display a list of text recently input to the selected text input box.

4. The broadcast receiver of claim 1, wherein the control unit is further configured to:
receive the second type of input selection on the second category object, and
replace the second category object with a third category object for performing a third function using the text in the text input box.

5. The broadcast receiver of claim 4, wherein the first function is for searching information via a first predetermined website and the third function is for searching information via a second predetermined website.

6. The broadcast receiver of claim 1, wherein the first and second category objects are displayed as an icon.

7. The broadcast receiver of claim 1, further comprising:
a keypad separate from the display unit,
wherein the control unit is configured to prevent the virtual keypad from being displayed when the keypad is activated.

8. The broadcast receiver of claim 1, further comprising:
a keypad separate from the display unit,
wherein the control unit is configured to cause a displayed virtual keypad to disappear when the keypad is activated.

9. The broadcast receiver of claim 1, wherein the first function corresponds to searching a memory included on the broadcast receiver and the second function corresponds to searching a webserver external to the broadcast receiver.

10. The broadcast receiver of claim 1, wherein each of the first and second category objects is toggled based on the received second type of input selection and is displayed as a single object.

11. The broadcast receiver of claim 1, wherein the first category object is replaced with the second category object without displaying a menu for selecting the second category object.

12. The broadcast receiver of claim 1, wherein the control unit is further configured to:
display a first type of keypad for inputting the text into the text input box when the first category object is displayed, and
display a second type of keypad for inputting the text into the text input box when the second category object is displayed.

13. The broadcast receiver of claim 1, wherein the second category object is not displayed before receiving the second type of input selection on the first category object.

14. A method of controlling a broadcast receiver, the method comprising:
receiving a broadcast via an Internet access;
displaying the received broadcast on a display unit of the broadcast receiver;
displaying, via the display unit, a text input box on the received broadcast;
receive a second type of input selection on a first category object to determine a first display mode for a control unit,
responsive to receiving the second type of input selection on the first category object, displaying, via the display unit, the first display mode;
receive a second type of input selection on a second category object to determine a second display mode for the control unit,
responsive to receiving the second type of input selection on the second category object, displaying, via the display unit, the second display mode;
receiving, via the control unit of the broadcast receiver, text input in the text input box;
in the first display mode, receiving, via the control unit, a first type of input selection on the first category object for performing a first function;
in the first display mode, displaying, via the display unit, first results of the performed first function on the display unit, based on the received first type of input selection;
in the second display mode, receiving, via the control unit, the first type of input selection on the second category object for performing a second function; and
in the second display mode, displaying, via the display unit, second results of the performed second function on the display unit, based on the received first type of input selection,
wherein the first display mode comprises display of the first category object for performing the first function using text in the text input box, and a first virtual keypad with a first set of virtual text input keys that are configured to match with the first category object, and
wherein the second display mode comprises display of the second category object for performing the second function using text in the text input box, and a second virtual keypad with a second set of virtual text input keys that are configured to match with the second category object,
wherein the first function is a first search function for searching a first preset website using the text in the text input box, and the second function is an Internet access function for accessing an Internet address in the text input box, and
the display of the first category object and first virtual keypad and the display of the second category object and second virtual keypad are mutually exclusive, so that either the first category object with first virtual keypad or the second category object with second virtual keypad is displayed, and not both the first category object and second category object,
the display of the first category object is coupled with the first virtual keypad, so that when the first category object is displayed, the first virtual keypad is also displayed, and when the first virtual keypad is displayed, the first category object is also displayed, and
the display of the second category object is coupled with the second virtual keypad, so that when the second category object is displayed, the second virtual keypad is also displayed, and when the second virtual keypad is displayed, the second category object is also displayed.

15. The method of claim 14, further comprising:
receiving, via the control unit, the second type of input selection on the second category object; and
replacing, via the control unit, the second category object to a third category object for performing a third function using the text in the text input box.

16. The method of claim 15, wherein the first function is for searching information via a first predetermined website and the third function is for searching information via a second predetermined website.

17. The method of claim 14, wherein the second category object is not displayed before receiving the second type of input selection on the first category object.

* * * * *